United States Patent [19]
Ueda et al.

[11] 3,829,872
[45] Aug. 13, 1974

[54] MEANS FOR OPERATING MIRROR AND DIAPHRAGM PRESET DEVICE IN A SINGLE LENS REFLEX CAMERA

[75] Inventors: Hiroshi Ueda, Nara; Kiyoshi Nishitani, Osaka, both of Japan

[73] Assignee: Minolta Camera Kabushiki Kaisha, Osaka, Japan

[22] Filed: Jan. 5, 1973

[21] Appl. No.: 321,467

[30] Foreign Application Priority Data
Jan. 13, 1972  Japan.................................. 47-5542

[52] U.S. Cl............................... 354/156, 354/272
[51] Int. Cl. .......................................... G03b 19/12
[58] Field of Search....... 95/42, 64 B; 354/156, 153, 354/152, 272

[56] References Cited
UNITED STATES PATENTS

| | | | |
|---|---|---|---|
| 3,442,192 | 5/1969 | Sato | 95/42 |
| 3,640,202 | 2/1972 | Nomoura | 95/42 |
| 3,730,063 | 5/1973 | Kabayashi et al. | 95/42 X |
| 3,731,609 | 5/1973 | Kobayashi et al. | 95/42 |

Primary Examiner—Samuel S. Matthews
Assistant Examiner—E. M. O'Connor
Attorney, Agent, or Firm—Watson, Cole, Grindle & Watson

[57] ABSTRACT

A manual operating device for the movable mirror and the diaphragm preset device in a single lens reflex camera, whereby, in connection with a shutter releasing operation of the camera, it is made possible to manually operate a mirror which is movable between a viewing position and a picture taking position, and also a lens diaphragm presetting device which is adapted to adjust a fully opened lens diaphragm to a preset position. Both the coupling of a reciprocating shaft, associated with the shutter releasing operation of the camera, to a mirror driving mechanism which is adapted to rotate the mirror from a viewing position to a picture taking position, and the coupling of said reciprocating shaft to the lens diaphragm presetting device, are effected by manipulation of an operating button; or the rotation of the mirror from the viewing position to the picture taking position and the operation of the lens diaphragm to assume a preset position may be manually effected by using said operating button, irrespective of the shutter releasing operation of the camera.

5 Claims, 17 Drawing Figures

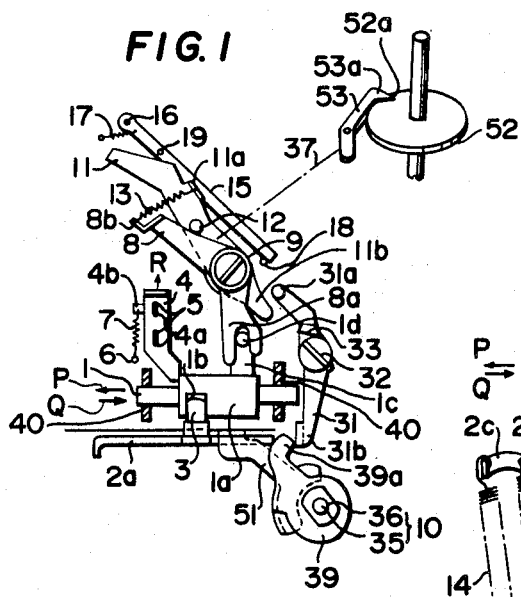
FIG.1
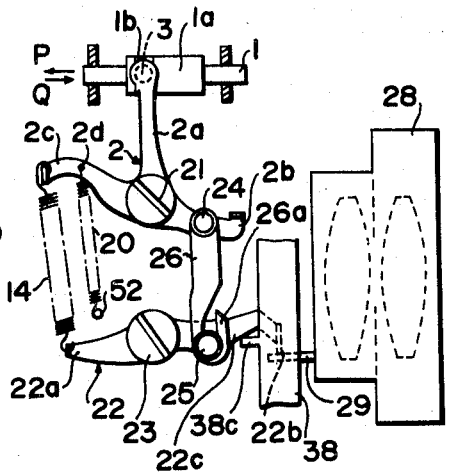
FIG.2
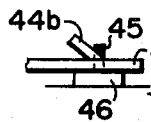
FIG.4A
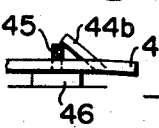
FIG.4B1
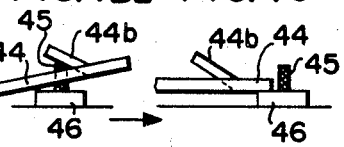
FIG.4B2  FIG.4C

3,829,872

FIG.5C1
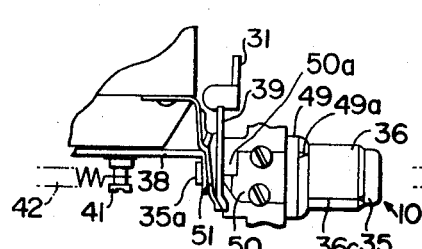
FIG.5C2
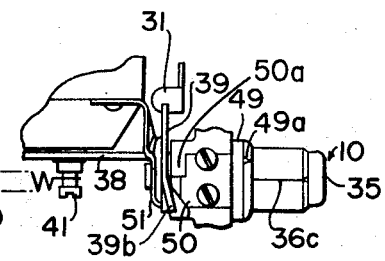
FIG.5C3
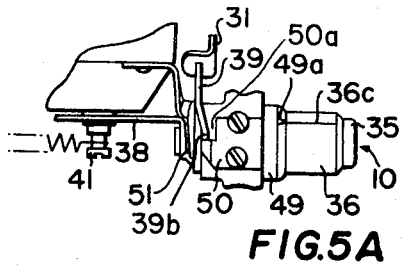
FIG.5E
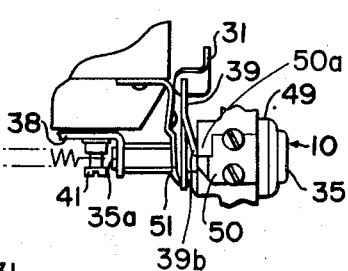
FIG.5A
FIG.6
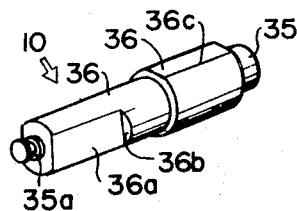

MEANS FOR OPERATING MIRROR AND DIAPHRAGM PRESET DEVICE IN A SINGLE LENS REFLEX CAMERA

BACKGROUND OF THE INVENTION

This invention relates to operating mechanism for the movable mirror and diaphragm preset device of single lens reflex cameras. More particularly, this invention relates to a manually operated device whereby the mirror and the lens diaphragm may be manually operated irrespective of the shutter releasing operation.

In single lens reflex cameras, it is the common practice to provide a driving mechanism for moving a mirror from a viewing position to a picture taking position and also for releasing the shutter. In most cases, the cameras are provided with a lens diaphragm presetting device for controlling a normally fully opened diaphragm to automatically assume a preset value in relation with the operation of the driving mechanism. More particularly, the driving mechanism is actuated generally by pressing a release button for automatically moving the mirror and setting the lens diaphragm at a preset value before releasing the shutter. After completion of exposure by the shutter release, the driving mechanism is actuated again for returning the mirror to the viewing position and the lens diaphragm to the full-open condition.

With such a camera construction, the connection between the driving mechanism and the movable mirror may be classified into two types, viz., a secure type connection where the mirror driving lever of the driving mechanism and the mirror are pivotally connected to each other by means of a pin or the like, and a loose type connection where the mirror alone is movable in one direction with respect to the driving lever, from the viewing position to the picture taking position.

The secure type connection is advantageous in that the setting of the lens diaphragm at the preset value may be effected by way of the driving mechanism. However, in this type the shutter is invariably released as soon as the mirror is moved to the picture taking position by the driving mechanism, and it is not possible to defer release of the shutter until a desired time while maintaining the mirror in the picture taking position, as required in photographing with lenses of short focal lengths, such as fisheye lenses, or as required when taking pictures of living beings which are extremely sensitive to sounds, unless the driving mechanism is locked before release of the shutter and then unlocked by a manually operated means other than the shutter releasing button of the camera. Such construction requires provision of a separate shutter releasing button in addition to the usual camera releasing button.

In the loose type connection, the mirror alone may be moved to th picture taking position by a preliminary operation.

Nextly, the connection between the driving mechanism and the lens diaphragm presetting device may be classified generally into two types, that is to say, a pressing type connection and a follower type connection. In the pressing type connection, a transmission member of the driving mechanism is positively pressed against a lens diaphragm lever of the lens system for setting the diaphragm at a preset value. On the other hand, in the follower type connection, the lens diaphragm lever is biased toward the setting position and brought thereto following rotary movement of a transmission member of the driving mechanism. The pressing type connection is advantageous in that substantially no time lags occur during transmission but disadvantageous in that the lens diaphragm presetting device is subjected to frequent mechanical shocks. The follower type connection has a disadvantage that time lags occur particularly when the transmission speed is increased, though the lens diaphragm presetting device is free from mechanical shocks. It is preferred to employ a follower type connection in high grade cameras to ensure satisfactory performance quality and durability.

However, inconvenience occurs when the follower type connection is used in combination with the loose type connection mentioned hereinbefore with reference to the connection between the mirror and the driving mechanism. For example, when the mirror is preliminarily held in the picture taking position, the mirror driving mechanism is operated under almost unloaded conditions so that the movements of the transmission members and the shutter releasing operation take place at an extremely high speed. This often results in a lens diaphragm lever failing to follow the movements of the transmission members and in releasing the shutter before setting of the lens diaphgram at a preset value.

On the other hand, it is desirable to reduce as much as possible the time required for actuating the shutter after the release button of the camera is pressed. A solution generally resorted to for satisfying this requirement is the provision of a construction capable of effecting the rotation of the mirror and the setting of the lens diaphragm simultaneously.

There have been proposed various improvements over the mirror operating device as mentioned above. However, almost all of them require three different switching operations for automatic diaphgram control, for manual diaphgram control and for mirror setting, and thus are troublesome.

THE OBJECTS OF THE INVENTION

It is an object of the present invention to provide a manual operation device for the movable mirror and the diaphragm preset device of single lens reflex cameras, which will overcome the above-noted defects and which, in particular, is capable of manually controlling switching between the automatic lens diaphragm control and the manual diaphgram control by means of a single manipulating member.

It is another object of the present invention to provide a novel device wherein automatic and manual control of the lens diaphgram presetting device and of the mirror may be effected by axial movement and rotation of a single push button member.

It is still another object of the present invention to provide a device which allows smooth and secure manual control of the mirror and the lens diaphragm presetting device.

It is a still further object of the present invention to provide a novel device, wherein multiple operations are effected by means of a single push button and wherein locking an unlocking of moving parts such as a push button, movable plate and mirror operating member may be carried out in an easy and secure manner.

The above and other objects, features and advantages of the present invention will become apparent from the detailed description of a preferred embodiment of the invention which will appear hereinafter.

SUMMARY OF THE INVENTION

In order to attain the various objects as noted above, the present invention provides a manual operation device for the movable mirror and the lens diaphragm preset device of single lens reflex cameras, the device comprising a push button for manually controlling the mirror position. The push button is held in a pushed-in position within a button seat during a photographing operation with automatic diaphgram control. For photographing by manual diaphgram control, the push button is projected outwardly from the button seat, the projecting action of the button bringing the diaphragm to a preset value. The mirror position may be manually controlled by rotating the push button in the projected position. The diaphragm may be returned to a full-open condition and the mirror to viewing position, respectively, by pushing in the projected button. The push button may be locked in the push-in position in which case the camera allows ordinary photographing operation by automatic diaphgram control.

BRIEF DESCRIPTION OF THE DRAWINGS

FIG. 1 is a fragmentary side view showing essential parts of a mirror operating device embodying the present invention;

FIG. 2 is a fragmentary bottom view of the device of FIG. 1;

FIGS. 4A to 4C are fragmentary diagrammatic views showing an end portion of the mirror operating device indicated by a broken circle X in FIG. 3, as viewed from the S side, FIGS. 4A, 4B1 and 4C being in positions corresponding to FIGS. 3A, 3B and 3C, respectively;

FIGS. 5A and 5C1 to 5C3 are elevational views showing the manner of connection between the mirror operating device and a push button assembly, FIGS. C1 to C3 being in positions corresponding to FIG. 3C while FIGS. 5E and 5A are in positions corresponding to FIGS. 3E and 3A, respectively; and FIG. 6 is a perspective view of the push button member.

DETAILED DESCRIPTION OF THE INVENTION

Figure 3A:
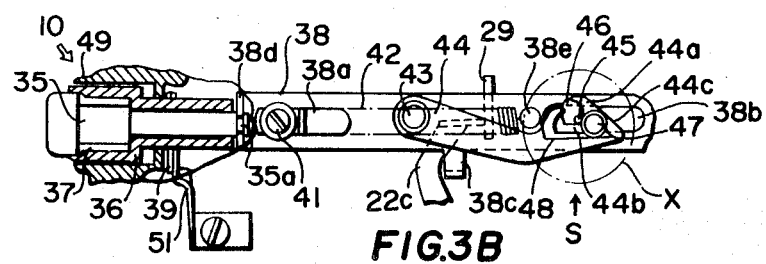
FIGS. 3A to 3E are fragmentary plan views showing essential parts of the mirror operating device of FIG. 1 at different operating stages.

The construction and operation of the diaphragm and mirror operating device according to the invention will now be described with reference to the accompanying drawings wherein there is shown only one specific embodiment of the invention.

Referring to FIGS. 1 and 2, there is shown the mechanism of a mirror box, as viewed from the back side thereof. A reciprocating shaft 1 is supported by spaced bearing plates 40 and 40 of the body structure of the camera for sliding movement in the axial direction in association with the operation of a quick return type mirror driving mechanism. The reciprocating shaft 1 is biased in the direction of the arrow P for reasons stated hereinafter. The reciprocating shaft 1 is provided with a larger diameter portion 1a which is formed with a groove 1b for engagement with a projection 3 which is provided on an arm portion 2a of an inversely T-shaped lever 2 of the mirror driving mechanism.

The leftward movement of the reciprocating shaft 1 is blocked by a stop member 4 which is abutted against the lefthand end of the larger diameter portion 1a of the reciprocating shaft 1. The stop member 4 is formed with slots 4a which are engaged with guide pin members 5 provided on the body structure of the camera. A spring 7 is tensioned between a projection 4b of the stop member 4 and a stationary pin 6 for normally urging the stop member 4 to engage with the reciprocating shaft 1. The movement of the reciprocating shaft 1 in the direction of the arrow P is thus blocked and the shaft 1 is held in the position of FIG. 1. The stop member 4 is moved upwardly when a release button (not shown) of the camera is pressed, allowing the reciprocating shaft 1 to move in the direction of the arrow P.

The reciprocating shaft 1 is provided with an arm 1c at the righthand end of the larger diameter portion 1a thereof. The arm 1c is formed with a projection 1d for engagement with a bifurcated arm 8a of a mirror driving lever 8 which will be described hereinafter.

The mirror driving lever 8 is pivoted on a shaft 9 projecting from the body structure of the camera. Between the mirror driving lever 8 and a mirror 15, there is provided a mirror operating lever 11 which is pivoted on the shaft 9. A spring 13 is extended between an arm 11a of the mirror operating lever 11 and an arm 8b of the mirror driving lever 8. The upper edge portion of the mirror driving lever 8 is held in engagement with a pin 12 of the mirror operating lever 11 while the upper edge portion of the mirror operating lever 11 is held in engagement with a pin 19 of the mirror 15, so that the clockwise rotational movement of the mirror driving lever 8 is transmitted to the mirror operating lever 11 by way of the pin 12 provided thereon and the clockwise rotational movement of the mirror operating lever 11 is transmitted to the mirror 15 by way of the pin 19 provided thereon.

Further, the mirror driving lever 8 is connected by way of a linking member 37 to a stopping lever 53 which is provided with a claw 53a for engagement with a notch 52a of a cam plate 52 which is adapted to block the driving of the front blind drum of a focal plane shutter. The claw 53a of the stopping lever 53 is disengaged from the notch 52a of the cam plate 52 by clockwise rotation of the mirror driving lever 8.

The mirror 15 is rotatably mounted on a shaft 16 and is normally held in the viewing position shown in FIG. 1 by means of a spring 17 connected thereto and a blocking pin member 18.

Referring to FIG. 2, the inversely T-shaped lever 2 which, as noted above, is formed with a projection 3 for engagement with the groove 1b in the larger diameter portion 1a of the reciprocating shaft 1, is rotatably mounted on a stationary shaft 21 which is secured to the body structure of the camera. The T-shaped lever 2 is biased to rotate in the counter-clockwise direction by means of a spring 20 which is tensioned between ap in member 2d on the left arm 2c of the lever 2 and a stationary pin 52 secured to the body structure. Associated with the T-shaped lever 2 is an S-shaped lever 22 which is rotatably mounted on a stationary shaft 23 which is similarly secured to the body structure of the camera. A shaft 24 projecting from the righthand end portion 2b of the T-lever 2 is connected to a pin 25 projecting from the right arm 22c of the S-lever 22 by way of a connecting link 26. One end of the connecting link 26 is rotatably supported on the shaft 24 while the other end of the connecting link 26 is hooked and loosely engaged around the pin 25 of the S-lever 22. The end portion of the left arm 2c of the T-shaped lever 2 is connected to the end portion of the left arm 22a of the S-shaped lever 22 by means of a relatively strong spring 14. As a result, the S-shaped lever 22 is rotatable in association with the T-shaped lever 2 in the clockwise direction but is rotatable in the counter-clockwise direction independently from the T-shaped lever 2.

The end portion 22b of the right arm 22c of the S-shaped lever 22 is disposed rearwardly of an interchangeable lens system 28 having an automatic diaphragm presetting device and is abutted against a diaphragm lever 29 which is biased in the diaphragm closing direction (upwardly in FIG. 2) by means of a spring provided in the diaphragm presetting device.

With the above arrangement employing a T-shaped lever and an S-shaped lever which are connected at one end of each by the spring 14 and at the other end of each by the connecting member 26, the reflecting mirror is driven when the driving torque is increased with the rotation of the driving members in order to ensure the rapid upward movement of the mirror. For this purpose, the left arm 2c of the T-lever 2 is formed longer than the left arm 22a of the S-shaped lever 22 and the two arms 2c and 22a are disposed divergently to form obtuse angles with respect to a line connecting the two shafts 21 and 23. Details of this driving mechanism will be found in commonly owed U.S. patent application Ser. No. 314,458, filed Dec. 12, 1972.

In FIG. 1, a connecting lever 31 is rotatably supported on a shaft 32 projecting from the body structure of the camera and carries a projection 31a in a position engageable with the lower end 11b of the mirror operating lever 11 for manually operating the mirror 15. A spring member 33 is interposed between the shaft 32 and the connecting lever 31 in order to bias the lever 32 to rotate in the clockwise direction. The lower end 31b of the connecting lever 31 is engaged with the fore end 39a of a manually operating member 39 which is fitted into an outer cylinder 36 of a push button member 10 which will be described hereinafter.

As shown in FIG. 3A, the push button member 10 comprises a stepped shaft member 35 and an outer cylinder 36. The button shaft 35 is fitted into the outer cylinder 36 for transmitting axial movement thereto, without imparting rotational movement. The push button member 10 is axially movable with respect to and rotatably supported on a button seat 49 which is securely fixed on the camera.

The outer cylinder 36 is formed with plane surfaces 36a on the outer periphery thereof, as shown in FIG. 6. The manually operating member 39 is fitted over the plane surface of the push button shaft 35 so that the manually operating member 39 is rotated about the shaft 35 with the rotation of the push button member 10. The manually operating member 39 is biased toward the button seat 49 by means of a leaf spring 51 which is secured to the body structure of the camera as shown in FIGS. 3A and 3C.

The elongated movable plate member 38 is formed from sheet material and is provided with slots 38a and 38b at the right and left ends thereof as shown in FIG. 3A. These slots 38a and 38b are held in engagement with guide pins 41 and 46, respectively, for guiding right- and leftward sliding movement of the movable plate member 38, as seen in FIG. 3C. A spring 42 (FIG. 3) is interposed between the stationary guide pin 41 and a pin 38e of the movable plate member 38 for imparting leftward movement to the movable plate member 38. The righthand end 35a of the button shaft 35 is connected to the lefthand end of the movable plate member 38 in such a manner as to allow rotational movement of the button shaft 35 with respect to the movable plate member 38. The movement in the axial direction of the push button 10 is associated with the movement of the movable plate member 38.

The stationary guide pin 46 which is fitted into the slot 38b is formed with a lock pin member 45 which is adapted to restrict the movement of the movable plate member 38 in association with a lock lever 44 which will be described hereinafter.

The movable plate member 38 is centrally provided with a shaft 43 for rotatably supporting one end of the lock lever 44. The lock lever is provided at the righthand end thereof with a projection 47. A spring 48 is interposed between the projection 47 and the pin 38e of the movable plate member 38 for imparting counterclockwise rotational movement to the lock lever 44. The pin 38e also functions as a stop for blocking counterclockwise rotation of the lock lever 44.

The lock lever 44 is provided at the righthand end thereof with a hooked portion 44a which is engageable with the lock pin 45 mentioned above. The hooked portion 44a is formed in the lefthand lower portion thereof with a punched out projection 44b (FIG. 4A) for permitting disengagement of lever 44 from the lock pin 45. In the position shown in FIG. 3A, the hooked portion 44a of the lock lever 44 and the lock pin 45 are engaged with each other, blocking the leftward movement of the movable plate member 38 under the action of the spring 42. If the push button 10 is pushed slightly rightwardly from this position, the movable plate member 38 and the lock lever 44 provided thereon are moved rightwardly likewise, the lock lever 44 being rotated slightly in the counterclockwise direction under the influence of the action of the spring 48 until the same is abutted against the pin member 38e. As a result, the lock pin 45 is disengaged from the hooked portion 44a and positioned under the punched out projection 44b, thus breaking the engagement between the lock pin 45 and the lock lever 44 as shown in FIG. 4B. The movable plate member 38 is thus moved in the leftward direction by the action of the spring 42 and the push button 10 is projected outwardly from the button seat 49 of the body. The movable plate member 38 is stopped when the righthand end of the slot 38a of the movable plate member 38 is brought into abutting engagement with the stationary guide pin 41, assuming the position as shown in FIGS. 3C and 4C.

If the push button 10 is pushed again from the position of FIG. 3C against the action of the spring 42, the movable plate member 38 is moved rightwardly and the lock lever 44 provided on the movable plate member 38 and the lock pin 45 are brought into such relative positions that the lock pin 45 is moved along the upper side surface 44c to impart a slight clockwise rotation to the lock lever 44 and then moved further to engage with the hooked portion 44a. The lock lever 44 is thus engaged with the lock pin 45 and returned to the position of FIG. 3A.

The movable plate member 38 is provided in the center portion thereof with a downwardly projecting member 38c which is brought into engagement with the arm 22c of the S-shaped lever 22 as the movable plate member 38 is moved leftwardly for rotating the S-shaped lever 22 in the counterclockwise direction against the action of the spring member 14, as seen in FIG. 2.

The operation of the mechanism described above is as follows:

1. Ordinary photographing operation with automatic diaphragm control:

In this case, the push button 10 is held in the pushed-in position within the button seat 49 as shown in FIG. 3A.

If the shutter button, not shown, is pushed when the mechanism is in the position of FIG. 1, the stop member 4 which is provided on one side of the mirror box is moved in the direction of the arrow R under the guidance of the guide pin members 5 against the action of the spring 7. The stop member 4 is therefore disengaged from the reciprocating shaft 1, allowing the same to be driven in the leftward direction by the driving mechanism including the T-lever 2, S-lever 22, spring 14 and connecting member 26.

With the leftward movement of the reciprocating shaft 1, the mirror driving lever which is rotatably mounted on the shaft 9 is rotated in the clockwise direction, causing the mirror operating lever 11 to rotate in the same direction. By this clockwise rotation of the mirror operating lever 11, the pin member 19 of the mirror 15 is pushed upwardly to cause the mirror 15 to rotate from the viewing position of FIG. 1 to the picture taking position.

When the reciprocating shaft 1 is moved in the direction of the arrow P, the T-shaped lever 2 of FIG. 2 is rotated about the shaft 21 in the counterclockwise direction, imparting similar counterclockwise rotation to the S-shaped lever 22 which is connected thereto by way of the connecting member 26. By this counterclockwise rotation, the end portion 22b of the right arm 22c of the S-lever is moved upwardly together with the diaphragm setting lever 29 which is in abutting engagement with the end portion 22b, for setting the diaphragm of the lens system 28 at a preset value.

When the mirror 15 is rotated into the picture taking position, the shutter is operated by way of the linking member 37 to effect an exposure. Upon completion of the exposure, the reciprocating shaft 1 is moved in the direction of the arrow Q by means of a suitable return drive mechanism (not shown), causing the mirror driving lever 8 to rotate in the counter-clockwise direction. As a result, the mirror operating lever 11 is also rotated in the counterclockwise direction, allowing the mirror to return to the initial viewing position under the influence of the action of the spring 17 and to reset on the blocking pin member 18.

On the other hand, the T-shaped 2 is rotated in the clockwise direction, as seen in FIG. 2, imparting clockwise rotation to the S-shaped lever 22 by way of the spring member 14. The end portion 22b of the right arm 22c of the S-shaped lever 22 is moved downwardly, pushing the diaphragm setting lever 29 of the diaphragm presetting device for returning the diaphragm to the full-open condition. After completion of the various operations mentioned hereinbefore, the reciprocating shaft 1 is blocked by the stop member 4 and held in the position of FIG. 1 again.

2. Manual diaphgram setting operation:

In the case of a manual diaphragm setting operation, the push button 10 and the movable plate member 38 are now considered to be in the position of FIG. 3A.

Figure 3B:
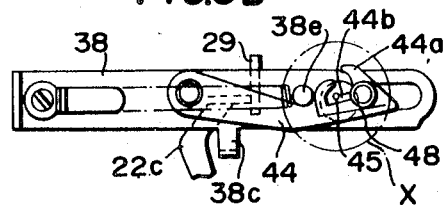
Figure 3C:
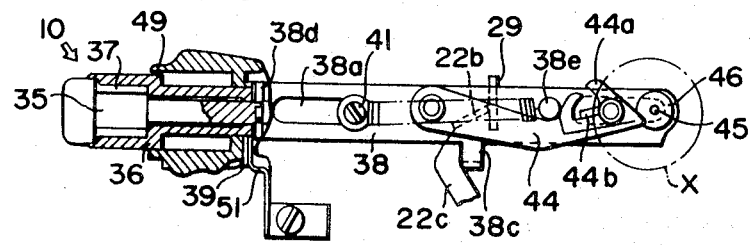

In order to manually control the lens diaphragm to a preset value when the operating device is in the position of FIG. 3A, the push button 10 is pushed slightly rightward against the action of the spring member 42 so that the movable plate member 38 which is associated therewith is moved also rightward to the position of FIG. 3B. The lock pin 45 which has been engaged with the hooked portion 44a of the lock lever 44 comes to a position below the punched out projection 44b which is provided in the lefthand lower portion of the hooked portion 44a, as shown in FIG. 3B, since the lock lever 44 is rotated counterclockwise by the action of the spring 48 while the lever 44 is moved slightly rightward. (See also FIG. 4B1). As a result, the engagement between the lock pin 45 and the lock lever 44 is broken and the lock lever 44 is moved leftwardly while being slightly raised by the lock pin 45, together with the movable plate member 38 under the influence of the returning action of the spring 42, until the stationary guide pin 41 is brought into abutting engagement with the righthand end of the slot 38a. The push button 10 which is associated with the movable plate member 38 is thus projected outwardly as shown in FIGS. 3C and 4C.

By the leftward movement of the movable plate member 38, the projection 38c formed on the movable plate 38 urges the end portion 22b of the right arm 22c of the S-shaped lever 22 to move in the leftward direction from the position of FIG. 3. That is to say, the end portion 22b of the right arm 22c of the S-lever 22 is pushed upwardly from the position of FIG. 2.

Thus, in FIG. 2, the lens diaphragm lever 29 which is in abutting engagement with the end portion 22b of the right arm 22c of the S-shaped lever 22 is moved upwardly to bring the lens diaphragm to a preset value.

In this instance, the connecting link member 26 is in engagement with the pin 25 which projects from the right arm 22c of the S-shaped lever 22, by way of the hooked portion 26a having a play as shown in FIG. 2, so that the connecting member 26 does not follow the upward movement of the right arm 22c of the S-shaped lever 22 and the mirror is held in the viewing position as shown in FIG. 1. Therefore, it is possible to observe the image through the lens diaphragm which is held at the preset value.

Figure 3D:
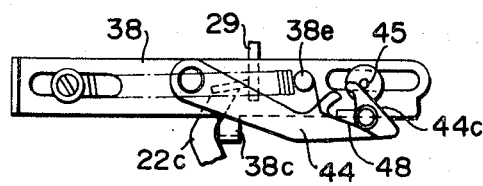
Figure 3E:
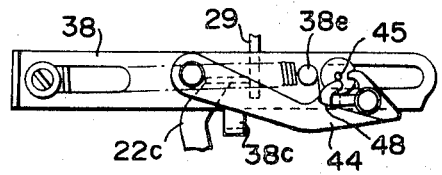

Then, if the push button of FIG. 3C is pushed in further, the movable plate member 38 is moved rightwardly as shown in FIGS. 3D and 3E, and the lock lever 44 which is provided on the movable plate 38 guides the lock pin 45 along the upper surface 44c of the hooked portion until finally the lock pin 45 is trapped in and engaged with the hooked portion 44a of the lock lever 44, resuming the position of FIG. 3A. The push button 10 is thus held in the pushed-in position with respect to the button seat 49.

By this movement of the movable plate member 38, the S-shaped lever 22 is rotated in the clockwise direction by the action of the spring 14 acting on the left arm 22a of the lever 22 and allowed to return to the initial position, bringing the lens diaphragm to the full-open conditions again.

3. Manual mirror operation:

The manual operation of the mirror is effected when the lens diaphragm is held at the preset value, that is to say, when the push button 10 is in the position of FIG. 3C.

When the operating device is in the position of FIG. 3C or 5C1 where the lens diaphragm is held at a preset value, the outer cylinder 36 may be rotated in such a manner as to bring the index mark 36c provided thereon into registry with another index mark 49a provided on the button seat 49. The cylinder 36 is provided with a mirror operating member 39 which is slidable in the axial direction by the action of the spring 51 and rotatable integrally with the cylinder, so that, when the cylinder 36 is rotated as mentioned hereinabove, the mirror operating member 39 is rotated in the clockwise direction in FIG. 1, the arm 39a of the mirror operating member 39 causing the connecting lever 31 to rotate in the counterclockwise direction for lifting the mirror 15 by way of the mirror operating lever 11, irrespective of the mirror driving mechanism.

Upon completion of the rotation of the mirror operating member 39, the end portion 39b of the mirror operating member 39 which is biased toward the button seat 49 by the action of the spring 51 is trapped in a notched portion 50a of the mirror lock plate and locked in the position 50 when the mirror 15 is rotated into the picture taking position as shown in FIG. 5C2.

Under these conditions, it is possible to adjust the lens diaphragm while maintaining the mirror 15 in the picture taking position.

In order to return the mirror 15 to the viewing position, the push button 10 in the position of FIG. 5C3 is pushed, so that the movable plate member 38 is moved from the position of FIG. 3C to the position of FIGS. 3D and 3E, returning the lens diaphragm to the full-open condition. On the other hand, when the push button 10 is pushed, the shoulder portion 36b (FIG. 6) of the plane surface 36a of the cylinder 36 pushes the end portion 39b of the mirror operating member 39 to move in the leftward direction in FIG. 5 and disengage from the notched portion 50a of the mirror lock plate 50. As a result, the connecting lever 31 is rotated in the clockwise direction by the returning action of the spring 33, the arm portion 31b of the connecting lever 31 causing the mirror operating member 39 to rotate in the counterclockwise direction by way of the arm portion 39a of the mirror operating member 39.

The mirror 15 is thus returned to the viewing position of FIG. 1.

We claim:

1. In a single lens reflex camera having a shutter and a shutter release mechanism, comprising: a mirror mounted for movement between a viewing position and a picture taking position and being biased normally into a viewing position; a lens diaphragm preset member for adjusting a lens diaphragm from a fully open condition to a position at a preset value, and including a diaphragm operating means; means for operating said mirror and said diaphragm preset member, comprising:

an operating member for moving said mirror from said viewing position to said picture taking position;

driving means for actuating said operating member to move said mirror into said picture taking position and thereafter releasing said shutter release mechanism;

means for blocking said driving member and releasing same in relation to the actuation of said shutter release mechanism;

a pushbutton axially and rotatably movable between a first position for connecting said diaphragm preset member with said driving member, said diaphragm preset member being in engagement with said diaphragm operating means, and a second position for breaking the connection between said diaphgram preset member and said driving member; and means for moving said operating member by rotational movement of said pushbutton when said pushbutton is maintained in said second position.

2. The camera as claimed in claim 1, further comprising a locking means for locking said push button in said first position thereof, the push button being relieved from the locking action of said locking means when pushed in.

3. The camera as claimed in claim 1, further comprising:

a blocking member for blocking further rotation of said push button when the same is rotated in said second position for holding the mirror in said picture taking position, the push button being relieved from the blocking action of the blocking member when turned from said second position to said first position.

4. The camera as claimed in claim 1, further comprising:

a movable plate member connected to said push button for axial movement therewith, said movable plate member being so connected as to allow rotational movement of said push button with respect thereto, and assuming a first position when said push button is in said first position thereof and a second position when said push button is in said second position thereof with respect to the body structure of the camera;

a biasing means for urging said movable plate member from said first position to said second position thereof;

a first stop member rotatably mounted on said movable plate member for locking said movable plate member when in said first position thereof;

a second stop member provided on the body structure of the camera for locking said first stop member by engaging therewith when said movable plate member is in said first position thereof;

a releasing means for relieving the first stop member from the locking action of said second stop member when the push button is pushed in from the first position to the second position thereof; and a projection formed on said movable plate member and engageable with said diaphragm adjusting member of said driving mechanism for actuating operating parts of said lens diaphragm preset member.

5. The camera as claimed in claim 4, wherein said driving means comprises a first lever rotatably mounted on the body structure of the camera for driving said mirror, a second lever rotatably mounted on the body structure of the camera and engageable with said diaphragm preset member for driving the same, a driving spring member connecting said first and second levers at one end of each, a connecting member for connecting the other ends of said first and second levers in such a manner that rotation of the first lever is transmitted to the second lever when the first lever is rotated in a direction for driving said mirror but not transmitted when rotated in the opposite direction, the connecting member establishing the connection between said first and second levers when said movable plate member is in the first position thereof but breaking the connection when the movable plate member is shifted from the first position to the second position.

* * * * *